United States Patent [19]
Reiter

[11] 3,862,462
[45] Jan. 28, 1975

[54] QUICK CHANGE SEGMENTAL BRUSH

[75] Inventor: Robert C. Reiter, Aurora, Ill.

[73] Assignee: Material Control, Inc., Aurora, Ill.

[22] Filed: Apr. 5, 1973

[21] Appl. No.: 348,118

[52] U.S. Cl. .................................. 15/182, 15/183
[51] Int. Cl. ........................................... A46b 13/02
[58] Field of Search ............ 15/179, 181, 182, 183, 15/198, 200

[56] References Cited
UNITED STATES PATENTS

| | | | |
|---|---|---|---|
| 2,651,799 | 9/1953 | Lombardi | 15/183 |
| 3,023,440 | 3/1962 | Peabody et al. | 15/183 |
| 3,255,479 | 6/1966 | Dolan et al. | 15/183 |

Primary Examiner—Peter Feldman
Attorney, Agent, or Firm—Whittemore, Hulbert & Belknap

[57] ABSTRACT

The brush structure includes a plurality of coaxially and axially spaced hub-like flange castings adapted to be fixedly attached to a rotary driver or other rotary support as a basic mount for a brush strip unit, to which hub parts plural like and correspondingly spaced mounting assemblies, each essentially comprising a pair of stamped seat or saddle bracket and radially registered brush-clamping clip bracket parts, are adjustably secured. A typical brush will have an open face character and feature a circumferentially spaced series of six axial or linear arrays of the axially spaced flange and bracket sub-assemblies, four in each line. The individual assembly more specifically comprises (a) a rigid steel seat or saddle bracket stamping radially outwardly conforming to and straddling a hub flange, the saddle providing a pair of radially outwardly convergent brush-confining and clamping lips or flanges; (b) a radially external wedging and clamping clip bracket, also a sheet metal stamping, which has radially inwardly convergent flanges to coact with the clamp flanges of the saddle in releasably wedging a sheet metal-backed brush strip therebetween; (c) an operating bolt or stud extending through radially registering holes in the clip and seat stampings, being adjustably threaded into tapped bore means of the hub casting; and (d) a coil compression spring encircling the shank of the bolt between the saddle and clip brackets to resiliently bias and maintain them in assembly on the hub structure regardless of the position of adjustment of the bracket structure, i.e., tightly taken up to clamp the brush strip or backed-off somewhat for an initial mounting or subsequent replacement of said strip. By preference the clamp flanges of the saddle part, with the latter straddling a flange casting in a displacement-resisting way, parallel one another at a slight angle to the axis of rotation of the brush, thus affording the usually desirable helical orientation of the brush units in an open face construction.

12 Claims, 5 Drawing Figures

QUICK CHANGE SEGMENTAL BRUSH

CROSS-REFERENCE TO RELATED APPLICATIONS

My co-pending application, Ser. No. 348,119, filed Apr. 5, 1973, discloses and claims an only generally related improvement of a throw-away type, but one in which comparable advantages are had in regard to easy removal and replacement of worn brush components.

BACKGROUND OF THE INVENTION

1. Field of the Invention

The brush construction of the invention most directly relates to the field of industrial belt-cleaning apparatus, in which a rotary cleaning or fixed scraping unit of one sort or another is diposed beneath and in engagement with a lower, return reach of a continuously traveling belt or mesh conveyor. However, other applications of the improvement are contemplated, as in the finishing or cleaning of many objects or products, in scrap removal, etc.

2. Description of the Prior Art

In an art collection at hand the most pertinent prior art patent is Lombardi, U.S. Pat. No. 2,651,799 of Sept. 15, 1953. It relates to helically oriented brush units as mentioned in the Abstract, but it does not show or suggest the herein claimed adjustable seat and clip clamping bracket arrangement. Nor is the latter represented equivalently and in point of advantages in known spring-less arrangements involving brush-wedging blocks of solid cross section.

SUMMARY OF THE INVENTION

As typically mounted by an appropriate rigid bracket structure and preferably rotatively driven, the brush structure of the invention engages lightly beneath a part of the return reach of an industrial conveyor belt to remove foreign matter therefrom. Specifically, the use of the adjustable brush wedging seat or saddle and clip assembly of the improvement, as described in the Abstract, eliminates the need for the machining of mounting hub components as represented by the herein-disclosed shaft castings; and each saddle bracket preferably presents a desirable helix angle at its integral brush strip wedging and clamping lip flanges, to which angle the coacting wedging clip adapts or self-aligns itself as the clamp bolt is threadedly taken up to a clamping degree, if not initially set at that angle.

The saddle bracket is sectionally contoured in a novel way to mate circumferentially over the driver shaft flange for the brush, and it presents pairs of radially inner tabs which complete a straddle of the flange in a way to restrain the saddle against rotation as the clamp bolt is rotated in either direction. Moreover, the compression spring interposed between the saddle and wedge clip, in addition to holding those parts in assembly, stabilizes the assembly in general in being applied to the hub flange, and as the clip parts are loosened, the spring separates them radially somewhat. Thus, the brush strip is progressively applied helically between clip and seat components of the several mounting assemblies along the axial length of the brush, the helixing is much facilitated since there is no appreciable binding effect as the brush lengths are slid helically between the axially successive pairs of clip parts. The same is true when the brush strips are removed for replacement.

In a general way the invention improves greatly on earlier only generally similar arrangements involving brush strip wedging blocks of solid cross section which fit into machined grooves of a rotary carrier. As pointed out above, no machining is called for pursuant to the invention. In removing and replacing worn brush strips, the improvement affords speed and ease, with a minimum of "down" time, inasmuch as bearings, drive arrangements and the like are undisturbed. Parenthetically, this is an important advantage attained in a very different way by the invention of my above-identified application, Ser. No. 348,119.

DESCRIPTION OF A PREFERRED EMBODIMENT

Figure 1:
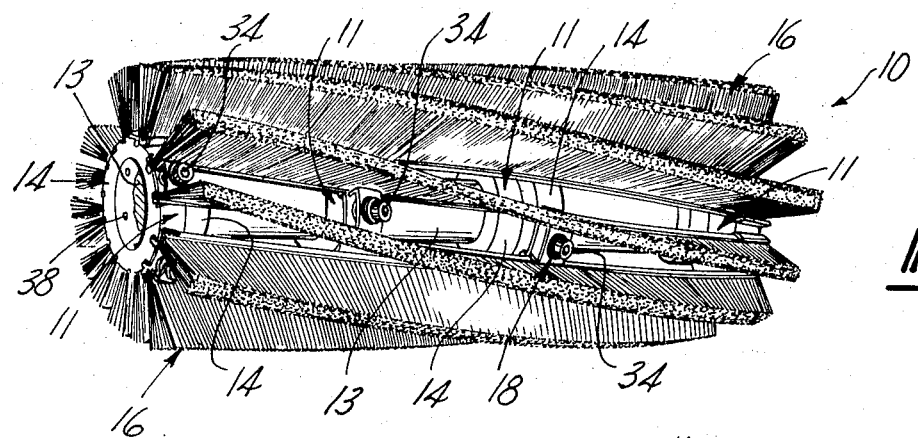
FIG. 1 is a perspective view of the quick change segmental and open face brush in accordance with the invention, an atypical central location of one of the brush-clamping assemblies being shown, inasmuch as it is more exposed than others.
Figure 2:
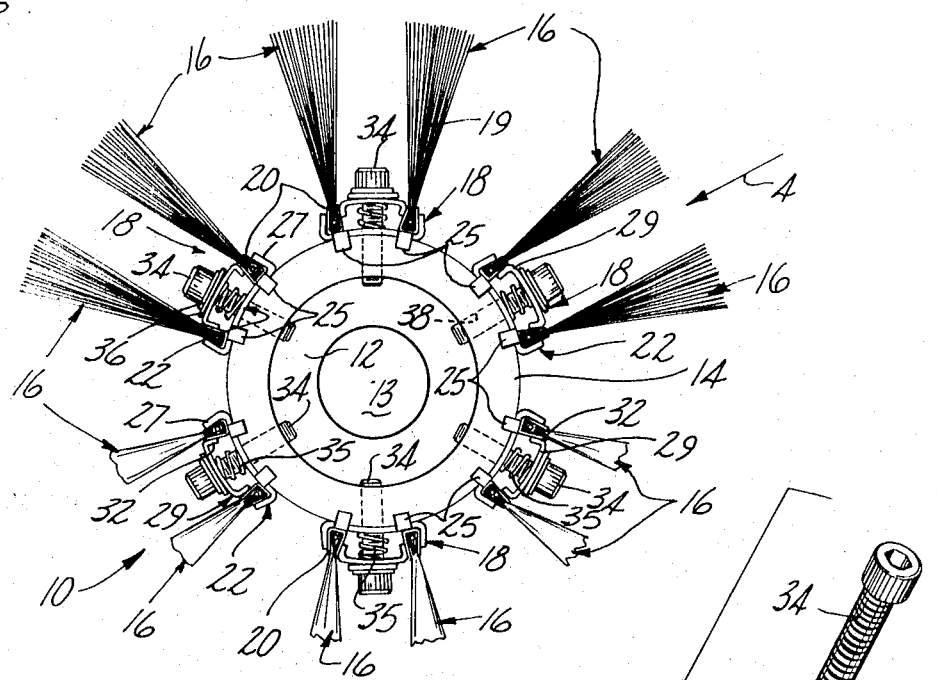
FIG. 2 is an axial end elevation of the brush structure of FIG. 1, better showing the assembly's relationship of brush-wedging clip, saddle and bolt components as they clamp helically contoured brush strips in place.
Figure 5:
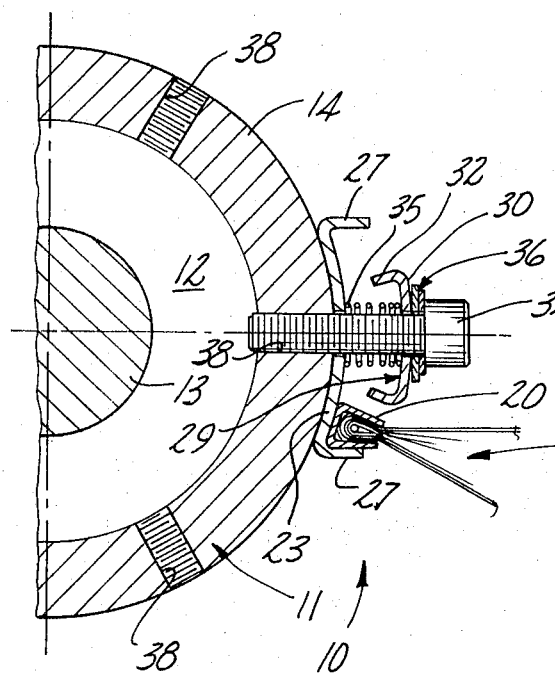
FIG. 5 is a fragmentary view in transverse vertical cross section on line 5—5 of FIG. 4, this view showing a wedging clip bracket as it would come radially inwardly into brush clamping position, or outwardly from that position.
Figure 4:
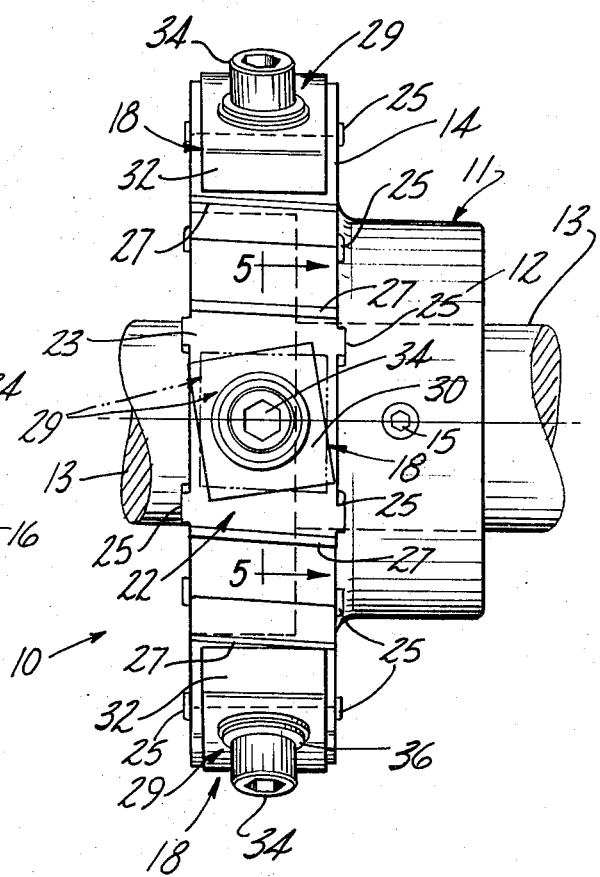
FIG. 4 is a fragmentary side elevational view (as in the radial direction of the arrow 4) of the brush structure of FIG. 2, the view indicating in dotted line an action of the outer clamping clip bracket in being set or coming into wedging alignment with wedge parts of the saddle bracket, brush units also being omitted.

As illustrated in FIGS. 1, 2 and 5, the brush construction of the invention, as generally designated by the reference numeral 10, comprises a plurality of like mounting flange members 11 in the form of iron or rigid non-metallic castings, each of which has an annular sleeve or hub portion 12 to surround a rotary mounting or driver shaft 13, and an integral, radially enlarged flange portion 14. A set screw 15, spline or equivalent means releasably locks each flange 11 at its hub portion 12 to the rotary mount 13 (see FIG. 4).

The several bracket assemblies by which backed brush units 16 (shown in FIG. 2 as comprising six pairs disposed in an open-face circumferentially well spaced arrangement) are releasably and removably attached to the hub flanges 12 are of identical construction, such assemblies being generally designated 18.

As for the brush units 16 themselves, they are helically contoured mildly entirely conventional in nature, being as illustrated and described in my co-pending application, Ser. No. 348,119, identified above, and generally similar to the units disclosed in the patent to Nelson, U.S. Pat. No. 3,134,123 of May 26, 1964 also the Lombardi patent mentioned above. That is, each such unit comprises an axially extending row of strands of metal or appropriate non-metallic brushing material 19 held radially inwardly by a relatively thin gauge U-cross section backing member 20 of sheet metal. As pairs they are circumferentially spaced generously from one another to allow ready access to screw driver means in manipulating the mounting assemblies 18.

Figure 3:
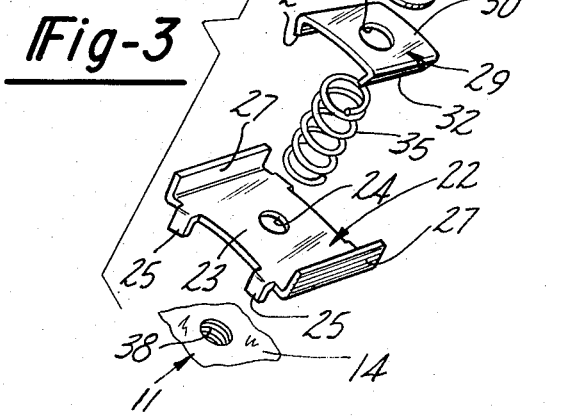
FIG. 3 is an enlarged exploded perspective view showing all component parts of said clamping assembly of FIG. 2, brush strips being omitted for clarity.

Each of the last-named assemblies comprises a number of parts, best shown individually in FIG. 3, including a rigid stamped, radially inwardly disposed sheet steel seat or saddle bracket 22 having an arcuate base portion 23 contoured concavo-convexly to mate over the outer diameter of the flange mounting formation 14, as appears in FIG. 2, the portion 23 being provided with a central aperture 24 for a purpose to be described.

The saddle stamping 22 has pairs of integral, circumferentially spaced and radially inwardly offset tabs 25 on opposite axial sides thereof, which tabs are proportioned as to axial spacing so as to snugly straddle opposite axial sides of the hub flange 14. They thus prevent relative rotation of the saddle 22, and the bracket assembly 18 as a whole, in the operations of assembling and adjusting the brush units 16 in a manner to be described.

Each saddle bracket 22 also affords a pair of integral, radially outwardly convergent clamp ribs or flanges 27 along opposite sides of its base portion 23, which flanges constitute outer retaining members for the wedging mount of the brush units 16 contemplated by the improvement. As best appears in FIG. 4, the wedging flanges 27 parallel one another at a slight angle to the rotative axis of the brush structure to permit the helical disposition of its brush units 16 which is shown in FIG. 1.

A second basic component of the mounting device 18 is a radially outwardly disposed clip bracket 29 also a rigid sheet steel stamping, which like bracket 22 is of a mildly arcuate circumferential contour in cross section across a central arcuate portion 30 thereof, that portion being centrally apertured at 31; and clip 29 presents a pair of radially inwardly convergent wedging ribs or flanges 22.

Further, the mounting unit or assembly comprises an Allen-head machine bolt or stud 34 which is proportioned at its shank to pass through the apertures 31 and 24 of the clip 29 and saddle 22 respectively, the shank also passing through a coiled compression spring 35 axially interposed between said stamping parts. The head of bolt 34 externally engages an assembly 36 of a yieldable lock washer and plain washer encircling the bolt shank radially outwardly of clip 30.

It is seen by reference to FIG. 5, considered with FIG. 2, that with mounting bracket assembly 18, as radially compressed and with its bolt 34 threadedly engaging, but backed radially somewhat outwardly in a tapped opening 38 in the cast mounting flange part 14, circumferential space is afforded between the respective pairs of angled flanges 27, 32 of seat and clip components 22, 29 to enable the ready sliding insertion of the backing strip of a brush unit 16 between said flange pairs; and that upon tightening up of the bolt 34, the wedging flange 32 of clip 29 will, if need be, automatically assume a mated and parallel relation to the helix flange 27 of saddle 22 (dot-dash line in FIG. 4) as the strip's backing element 20 is taken into wedged clamping engagement between those flanges. In any event, the resilient suspension of clip 29 enables it stably to maintain any angular position in which it is set prior to tightening, the entire mounting unit 18 being self-sustaining and self-held in assembly before being taken up.

What is claimed is:

1. A rotary brush structure comprising a plurality of similar elongated circumferentially spaced brush units each of mildly helical contour in a direction paralleling the axis of said structure as applied to the latter, and means for adjustably mounting said units to a rotary support of said structure to extend radially outwardly of the latter, said means including an assembly of axially spaced pairs of rigid internal seating and external wedging clip parts of U-shaped cross section in a plane at 90° to the rotative axis of the structure, the seating and clip parts being in radial register with one another, and being formed to receive a brush unit in wedged clamping engagement therebetween, pairs having means to adjustably mount the same to said rotary support to effect relative radial movement thereof in bringing them into and out of wedge-clamping engagement with the brush unit, said means including a spring coacting with said parts and biasing at least one thereof from the other in a radially separating direction.

2. A rotary brush structure comprising a plurality of similar circumferentially spaced and axially backed brush units generally paralleling one another in an axial sense, and means for adjustably mounting said units to a rotary support to extend radially outwardly of the latter, said means including a plurality of pairs of like, axially spaced rigid internal seating and external wedging clip parts of U-shaped cross section in a plane at 90° to the rotative axis of the structure, the pairs of seating and clip parts being in radial register with one another and spring-biased in a separating sense, and being formed to receive a brush unit in wedged clamping engagement therebetween, said pairs each having a threaded member extending therethrough and threadedly engageable with the rotary support to adjustably mount the pair to said rotary support to effect relative radial movement of one of said parts in bringing them into and out of wedge-clamping engagement with the axial backing of the brush unit, and a spring coacting with said threaded member in resiliently biasing the clip part in a radial direction away from said wedge-clamping engagement.

3. The brush structure of claim 1, in which said clip parts are rigid sheet metal stampings of limited axial length affording pairs of integral radially offset flange formations, between each of which respective pair formations a brush unit is wedgingly received and finally clamped.

4. The brush structure of claim 2, in which said clip parts are rigid sheet metal stampings of limited axial length affording pairs of integral radially offset flange formations, between each of which respective pair formations a brush unit has its axial backing wedgingly received and finally clamped.

5. The brush structure of claim 1, in which said rotary support includes, for each mounting part pair, an annular radially outwardly projecting flange member radially outwardly straddled by formations of the radially internal seating part of the pair.

6. The brush structure of claim 2, in which said rotary support includes, for each mounting part pair, an annular radially outwardly projecting flange member radially outwardly straddled by formations of the radially internal seating part of the pair.

7. The brush structure of claim 3, in which said rotary support includes, for each mounting part pair, an annular radially outwardly projecting flange member radially outwardly straddled by formations of the radially internal seating part of the pair.

8. The brush structure of claim 4, in which said rotary support includes, for each mounting part pair, an annular radially outwardly projecting flange member radially outwardly straddled by formations of the radially internal seating part of the pair.

9. The brush structure of claim 5, in which said seating part is concavely contoured in cross section between radially outwardly offset flange formations thereof for a mated circumferential fit on the outwardly projecting flange member of the rotary support with the seating part straddling said member.

10. The brush structure of claim 8, in which said seating part is concavely contoured in cross section between radially outwardly offset flange formations thereof for a mated circumferential fit on the outwardly projecting flange member of the rotary support with the seating part straddling said member.

11. The brush structure of claim 5, in which the external clip part is rotatively adjustable relative to the internal seating part prior to final clamping of the brush unit.

12. The brush structure of claim 8, in which the external clip part is rotatively adjustable relative to the internal seating part prior to final clamping of the brush unit, being held in an at least preliminarily adjusted position by the spring bias on the parts.

* * * * *